United States Patent
Rode et al.

(10) Patent No.: US 7,103,000 B1
(45) Date of Patent: Sep. 5, 2006

(54) METHOD FOR COORDINATING NETWORK COMPONENTS

(75) Inventors: Detlef Rode, Hemmingen (DE); Uwe Zurmuehl, Giesen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,101

(22) PCT Filed: Nov. 30, 1998

(86) PCT No.: PCT/DE98/03517

§ 371 (c)(1),
(2), (4) Date: Aug. 21, 2000

(87) PCT Pub. No.: WO99/30459

PCT Pub. Date: Jun. 17, 1999

(30) Foreign Application Priority Data

Dec. 9, 1997 (DE) .................... 197 54 640

(51) Int. Cl.
*H04L 12/26* (2006.01)

(52) U.S. Cl. .................... 370/241; 340/825.25

(58) Field of Classification Search ...... 340/5.22–5.27, 340/825.3, 825.5, 572.3–572.4; 370/241–245, 370/248, 252
See application file for complete search history.

(56) References Cited

U.S. PATENT DOCUMENTS

| | | | | |
|---|---|---|---|---|
| 5,251,211 A | * | 10/1993 | Mutoh et al. | 370/445 |
| 5,351,041 A | * | 9/1994 | Ikata et al. | 340/825.24 |
| 5,592,675 A | | 1/1997 | Itoh et al. | |
| 5,915,238 A | * | 6/1999 | Tjaden | 704/260 |

FOREIGN PATENT DOCUMENTS

| | | |
|---|---|---|
| DE | 41 31 133 | 4/1993 |
| DE | 196 37 312 | 3/1998 |
| EP | 0 399 491 | 11/1990 |
| WO | 97 36183 | 10/1997 |

OTHER PUBLICATIONS

ISO 7490, Information Processing Systems—Open Systems Interconnection Basic Reference Model, 1984.

* cited by examiner

*Primary Examiner*—Hanh Nguyen
*Assistant Examiner*—Thai Hoang
(74) *Attorney, Agent, or Firm*—Kenyon & Kenyon LLP

(57) ABSTRACT

A method to coordinate network components is proposed. At least one first logical component and at least one second logical component are provided. Each of the components corresponds to a specific application and communicate with each other via a network on a communication plane that is substantially independent from an application plane. According to the method, a communications connection is established between the at least one first logical component and the at least one second logical component at the initiative of one of the at least one first logical component and the at least one second logical component, functioning in response to a specific event that concerns at least one of the at least one first logical component and the at least one second logical component. Moreover, an information message is transmitted via the established communications connection from the at least one second logical component to the at least one first logical component, the information message including at least information with respect to a current application status of the at least one second logical component. In addition, the information of the transmitted information message in the at least one first logical component is compared with corresponding information stored in a nonvolatile memory.

6 Claims, 1 Drawing Sheet

METHOD FOR COORDINATING NETWORK COMPONENTS

FIELD OF THE INVENTION

The present invention relates to a method for coordinating or adjusting network components, in particular master and slave components. At least one first logical component and one second logical component is provided, each of which corresponds to a specific application and can communicate with each other via the network on a communications plane that is essentially independent of an application plane, as described in European Published Patent Application No. 0 399 491.

BACKGROUND INFORMATION

European Published Patent Application No. 0 399 491 further describes the establishment of a communications connection between the first logical component and the second logical component, and the transmission of an information message across the established communications connection from the second logical component to the first logical component. The information message contains information regarding the current application status of the second logical component, as well as a comparison of the information of the transmitted information in the first logical component with corresponding information available at the first logical component.

The present invention can be applied in wide areas of communications technology, but it is explained in greater detail, by way of example, only in relation to a CAN network system for use in the automotive area.

In systems of this type installed in a motor vehicle, there often arises the situation that only individual components of the network system carry out a restart, i.e. reset, in response to a failure or fault. A typical trigger for a reset of this type is the detection of an undervoltage condition, which can vary from component to component.

From this arises the fundamental problem to define specific communications mechanisms between the components, in order to achieve a restarting of the distributed applications as rapidly as possible. In this context, it is generally advantageous to reproduce to reproduce or coordinate the state of the entire system before the reset. This is of particular significance for systems that have user interaction, for example via a display and operating element, in order to minimize the disturbances triggered by resets during operation, such as images on a display that are no longer current, delays in the servicing of components, lost inputs, etc.

The problem underlying the present invention thus generally lies, in a network having distributed applications, in effectively coordinating the network components, corresponding to applications. This applies specifically to a restart after a failure in individual components.

In general, the following four cases must be detected and treated appropriately.

i) "Normal" start-up of all components (system start).

ii) Simultaneous failure in all components after systems start, e.g., as a result of an undervoltage for all components in the network.

iii) The failure in a partial system after system start, i.e., a failure condition in one or a plurality of components.

iv) A hardware reset after a first power-on or fatal failure.

First, the specific problem of a reciprocal coordination or synchronization of distributed applications and the logical components that correspond to the latter will be explained in greater detail.

In systems in which components communicate with each other via a network, for example, a bus system, a specific basic prerequisite for the method described here is a separation of communication and application within one component (see ISO 7490, Information Processing Systems— Open Systems Interconnection Basic Reference Model, 1984).

At issue here are systems that communicate via a network, e.g., a bus system, communication and application being defined as follows.

Communication denotes all functions that are required for the purpose of reliable data exchange with other components. Typically, a stratification is used that is derived from the OSI model of the ISO (see above), i.e., the conversion from the physical layer to the application interface. For in the current approaches in the automotive area, only one subset of the OSI model is used, adjusted to the requirements of this application area, i.e., some layers remain "empty." Furthermore, as an expansion of the OSI model, a network management that includes the different layers is usually used, synchronizing the different components with respect to communication.

Application denotes the specific task of each component, e.g., the functionality of the CD player or the various functions of a car telephone.

In systems having at their disposal logical point-to-point (1:1) connections between the individual components, the "commands" of the application of a component A are relayed to component B via a connection of this type, component B then responding, e.g., with an application acknowledgment. An example is the activation, using an operating element, of a CD changer to play.

Advantageously, these 1:1 connections of the application plane are reproduced in the 1:1 connections of the transport layer (layer 4 in the OSI model). While the 1:1 transport connections can be set up or, in the case of failure, reset by both participating components, which corresponds to a symmetrical method, this does not apply to the application plane. Here, for example, only one component A—the "master"—is entitled to control one component B—the "slave." This is especially true for switching the main states of the slave, for example, "on" and "off."

Advantageously, a system of this type is based on network management, which also distinguishes between master and slave functionality. In this case, an "application master" is usually also simultaneously a "network management master." In addition, however, systems are possible that, in network management, recognize only equal-access stations, in which therefore the master/slave distinction is limited to the application plane. A typical example for the latter network management method is "decentralized network management," on CAN networks in the chassis area of the automotive industry.

Unless otherwise expressly stated, in what follows the designations "master" and "slave" always apply to the application plane.

Therefore, a relatively simple system is composed of one master and at least one slave, employing in each case a 1:1 connection between master and each slave. Of course, more complex systems can be constructed, that are composed of a plurality of master components having the same or even different slaves. In this context, however, the assumption is that for every logical connection, it is unambiguously established, which component is the master and which component is the slave. In this manner, a hierarchical system can then be formed out of master, sub master(s), and slaves, as is described in German Published Patent Application No. 196 373 12.

Usually, the master is largely responsible for the coordination of network-wide applications. For the slave, it is sufficient to detect the reset of the master, for example, via a network management service.

For the slave, this leads, for example, to the initiation of certain emergency functions or to an autonomous shutdown.

The master detects the reset of the slave component either through a cyclic querying of the slave status or through a fresh communication set up, initiated by the slave (e.g., a communication system having network management and a transport protocol in accordance with the prior applications, German Published Patent Application No. 41 31 133 or German Published Patent Application No. 196 373 12).

The above-mentioned approach is disadvantageous because the cyclic querying of the slave status by the master is cumbersome and communications-intensive, since usually no change of status is present. Furthermore, this querying mechanism is inflexible, since generally only components are queried that have already been installed.

Finally, a fresh communication setup by the slave, as an alternative to the above cyclic querying mechanism, brings with it the disadvantage that, except for the information that the communication has again been established, the master receives no messages concerning the cause of the reset and/or its prehistory, i.e., by way of example, the previous application status.

The type of local reset can be detected by the master, e.g., through the entry of local status information into a non-volatile memory, such as an EEPROM, and through evaluation of the entry at a subsequent restart.

If, after a reset, the master, for example, discovers the entry, "system started and in normal operation," then it can infer a restart as a result of a failure condition. On the other hand, if "system is shut down" is entered, then it is a question of a normal startup. In the case of a failure, the problem is the limited memory possibilities in the master.

In general, only the local status can be saved, since, for the status storage of all connected slaves, the time and/or the memory capacity is usually not sufficient. In addition, in the event of a failure-reset of the master, having recourse to status information concerning the slave stored, for example, in an EEPROM is risky, since the slave could also have carried out a reset and thus the stored slave state deviates from the current state.

Since, in the above standard approaches, no detailed and stored status information concerning the slave is available, the master will generally restart or initialize the slave application.

Since, as a result, the previous settings generally must be reset, this signifies the loss of knowledge concerning the prehistory of the slave, i.e., the original operating state or status of the application can no longer be derived. Noticeable delays generally result from the restart of the slave application.

SUMMARY OF THE INVENTION

In contrast to the conventional approach, the method according to the present invention has the advantage that it can efficiently reinstate the prior application state (application status), for example of a slave, before the occurrence of a failure at any point in the network.

In this manner, it is made possible, for example, to carry out a reset, if appropriate, only locally at the slave in question. The reset is not noticed by the user of the system—for example, an automobile driver—, since a global reset can be dispensed with.

Through the controlled reset of the slave that has failed for a short time, there generally results a time advantage in comparison to the usual approaches, in which all running applications must be initialized once again. Furthermore, additional possibilities for network-wide diagnoses are generated.

According to the present invention, as a result of the transmission of the prehistory, for example, in connection with a network-status table in the master, a reliable detection of new components in the network is also possible without great configuration expense for the master. Since, in the information message according to the present invention which in the following text is also designated as startup info, it is advantageously communicated as to whether a component is participating in the network operation for the first time, the master can react accordingly, e.g., by releasing new operating menus.

In addition, the method according to the present invention provides locking of applications in certain states, for example, in the event that more than one master accesses a slave. This applies especially to the case in which a master has brought the slave into a diagnosis mode. In this case, the slave is generally no longer controllable by a further master. For this master, this is also directly evident from the startup info, e.g., after a reset. In addition, the startup info is suitable for the transmission of semaphores, which are important for the synchronization of distributed applications and for processes in the data-processing technical meaning.

The concept underlying the present invention lies in performing resetting or configuring on the application plane by the master or masters, taking into account the currently reported application status, through the fact that the slave or slaves save their current status in a memory, are in each case reactualized after a change, and, after certain events, e.g., a failure in the sphere of the slaves, transmit startup info to the master.

In this context, the successful set up of the 1:1 connection between master and slave is used as the trigger for the latter message. As the trigger proceeding from the master for this connection is set up, in turn, certain network management telegrams, referred to as watchdog telegrams, can be used, but also, for example, a circuit line controlled by the master.

Furthermore, this trigger can also be grounded in the slave. A typical example is the waking up of a network by a telephone component. In this case, the initiative to the connection setup proceeds solely from the slave.

In accordance with an advantageous embodiment, the information of the transmitted information message in the first logical component is stored in the non-volatile memory.

According to a further advantageous embodiment, the first logical component uses the information of the transmitted information message to reconstruct the state before the setup of the communications connection.

According to a further advantageous embodiment, the information message, after a reset in an application that has already been started, is transferred to at least one of the first or the second logical components.

Particularly advantageous applications of the method according to the present invention lie in measuring and/or monitoring systems, in automobile on-board information systems, and in network-wide failure location and/or failure diagnoses of network components of systems of this type.

DETAILED DESCRIPTION

Figure 1:
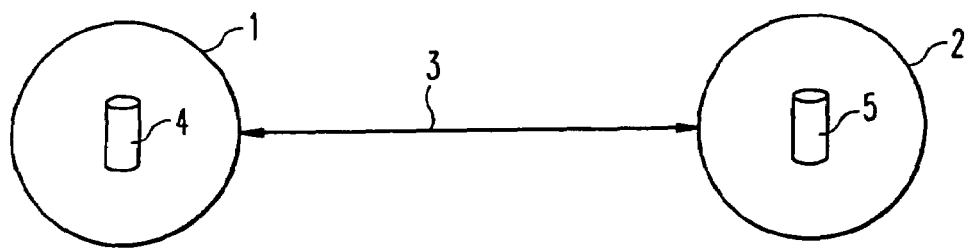
FIG. 1 shows a schematic representation of participating network components, a master connected to a slave, in accordance with a first embodiment of a method according to the present invention.

FIG. 1 depicts a schematic representation of the participating network components in accordance with a first embodiment of the method according to the invention, namely a master, which is connected to a slave.

FIG. 1 shows a radio 1, a CD changer 2, a communications connection 3 between radio 1 and CD changer 2, and two non-volatile memory 4, 5.

The relatively simple system contains radio 1 as master CD changer 2 as slave of radio 1, and a communications connection 3 connecting both network components 1, 2 to each other, in the form of a bus line. In addition, both radio 1 and CD changer 2 have at their disposal non-volatile memory 4 and 5, respectively, which could be realized, for example, in the form of buffered SRAMs or EEPROMs. Memories 4, 5 function to store data, whose evaluation by master 1 functions to coordinate network components 1, 2.

Figure 2:
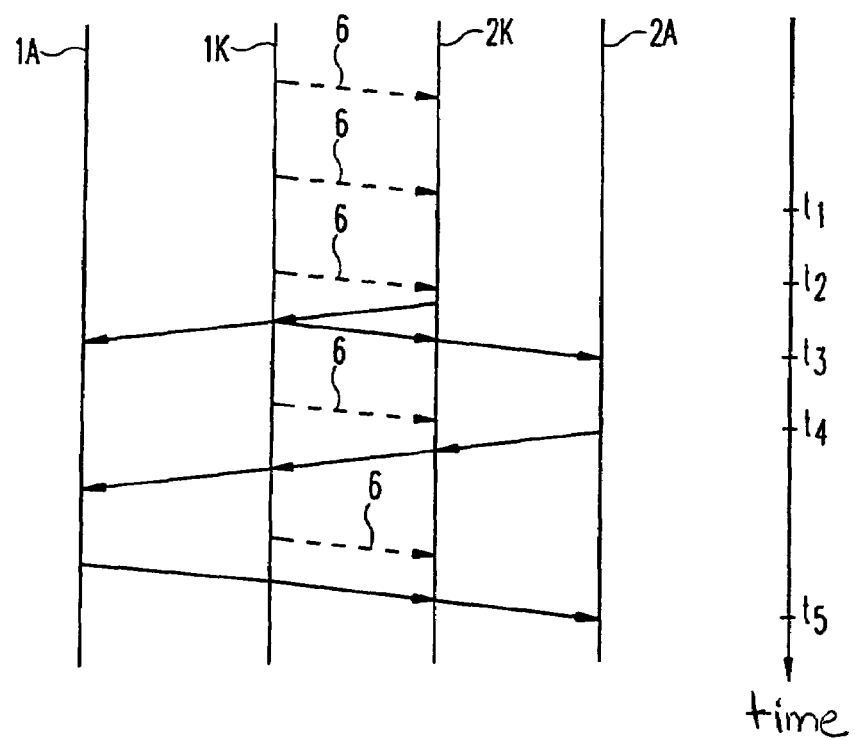
FIG. 2 shows a temporal course of the method according to the present invention in accordance with the first embodiment, processing temporally from top to bottom in a rest of the slave as a consequence of a undervoltage.

FIG. 2 depicts, in schematic form, the temporal course of the method according to the present invention in accordance with the first embodiment, progressing temporally from top to bottom in a reset of the slave as a consequence of an undervoltage.

In FIG. 2 shows a watchdog telegram 6, i.e., a request of radio 1 to CD changer 2, to set up or maintain a communication.

The left exterior line represents application interface 1A of radio 1, the second line from the left represents communications interface 1K of radio 1, the third line from the left represents communications interface 2K of CD changer 2, and the right exterior line represents application interface 2A of CD changer 2.

In the beginning, and in FIG. 2 above $t_1$, the system is initialized and both components, radio 1 and CD changer 2, are in operation. In CD changer 2, its status, for example, "Play," is stored in non-volatile memory 5. From radio 1, watchdog telegrams 6 are cyclically transmitted to CD changer 2.

At time point $t_1$ itself, an operational breakdown occurs, here an undervoltage in CD changer 2, which makes a reset of CD changer 2 necessary. As soon as this undervoltage is detected as such, in addition to the already stored current application state "Play" of CD changer 2, the desired further information concerning its prehistory, e.g., "failure in slave," as well as the last position of the CD scanning system, is stored in its non-volatile memory 5.

In response to an undervoltage arising in a component, the supply voltage in general does not fall to zero volts. The reason for this is a buffering of the supply voltage. In response to light undervoltages, certain measures can be initiated for saving current data in the non-volatile memory (if available). Associated with this is usually a reset of the application and/or the communication (e.g., disconnecting of the logical connections). If the voltage once again increases, then the application and, if appropriate, the communication must be re-initialized ("warm start").

In this context, initialization of the application signifies a preparation of the application and, if appropriate, a start of the application (generally no autonomous application start in a slave). The initialization of the communication signifies the performing of preparations for communication with other network components, e.g., a connection setup.

Only if the supply voltage falls below a critical value is there a danger of a hardware reset of the microcontroller as well as the loss of all data in the volatile memory (RAM). After a hardware reset, the components must carry out a "cold start," in which, generally, a specific initialization routine must be traversed. A basic initialization of this type relates to the components on the lowest plane, e.g., setting/re-setting of the μC ports, etc. If, for example, in this routine, a flag is set in RAM, the possibility exists of distinguishing a cold start (loss of all data if no non-volatile memory is available) from a warm start (partial loss of data). The concept 'reset' should therefore not be equated necessarily with a hardware reset of the microcontroller.

CD changer 2 at $t_2$ now receives a watchdog telegram 6 from radio 1 and consequently sets up the connection to radio 1 again.

At $t_3$, radio 1 acknowledges the connection to CD changer 2. Connected to this is a re-initialization of the communications connection in radio 1.

At $t_4$, CD changer 2 transmits the information message, the start-up info, to radio 1. Radio 1 processes this information message, and as a consequence, transmits to CD changer 2 at $t_5$ the appropriate application messages to restore the previous state before the occurrence of the undervoltage, for example, the commands "switch on" and "play." Thus the state is restored in which the system was before the onset of the undervoltage, disturbing the system.

As support for the functional sequence described here, it should be noted that as a rule it is not useful that the slave attempts on its own to restore its prior state completely. The reason is that it is possible that a failure has occurred in the master as well (or in another, undepicted, component), so that the various applications are no longer synchronized. For example, it would not be sensible if the CD changer were to restore its prior state "play" autonomously, but the radio, as a result of its internal reset, were no longer to process the audio signals of the CD changer.

The essential content of the information message, "start-up info," is the current application state of CD changer 2 or the slave, to the extent that the content is significant for the operation of CD changer 2 from the point of view of radio 1 or the master. Significant application main states, from the point of view of this master, are, for example, on/off, i.e., they indicate to radio 1 whether the slave application is available for the master.

However, other specific application states can also be activated and, accordingly, reported to the master, such as the restitution of a CD changer (play) in the present exemplary embodiment or perhaps a diagnosis mode.

Further specific states of the slave can denote that the slave possesses only a limited functional scope, since, for example, the application software must still be loaded from a CD-ROM or because a locking of the slave exists on the part of other logical connections, as was mentioned above.

Likewise, diverse states of the human-machine interface of the slave can be displayed to the master, for example, as menus or in windows on a screen, or the current layout of the softkeys in the system.

An optional constituent component is the initialization initiation. This is a constituent component that indicates who ultimately has initiated the setup of the communications connection.

This initiation can be grounded both in the master as well as in the slave. In the first case, which represents the normal use and underlies the above example, the master provides the initialization initiation, e.g., through a network management mechanism in the form of a watchdog telegram. An example for the second case is a slave waking up, which, for example, is triggered by the connection-setup-telegram of the slave. Based on the transmitted information "initialization initiation by the slave," the master in the latter case can interpret the unexpected communication setup by the slave as a wake-up and can distinguish it from failure cases.

A further optional constituent component describes the prehistory of the application. In this case, the session was ended by a failure, resulting in a reset of the communication as well as the application due to the occurrence of an undervoltage of CD changer 2. Therefore, the constituent component has the meaning "failure in the slave," and can be signaled by a flag or another sign.

In another case, if the application in the prior session, i.e., in the prior contiguous time period having a valid 1:1 connection between radio 1 and CD changer 2, was abandoned normally, for example, through a switch-off command, the content of the constituent component could have the meaning "OK."

If CD changer 2 is on the network for the first time, then the content of constituent component could have the meaning "new." A sign of this type is important for a basic initialization after a replacement or a re-installation, or for a diagnosis after a fatal failure.

In the transmission of the prehistory, it is important to note that the start-up info exclusively reflects the point of view of the slave. Only a comparison with the data stored in the master makes possible a final statement concerning the prehistory of the system.

It is generally true that application and communication are equally initialized only in the component that performs a reset during the operation. On the other hand, in the connected component, here radio 1 as master, only a reset of the communication is carried out. The reset is necessary to synchronize the 1:1 communications connection once again. The application of the master is normally not directly affected by the reset of other components.

An initialization of the communication is therefore possible even without an initialization of the application. In a 1:1 connection, in the case of failure, a reset of the communication layers takes place on both sides, whereas the application, for example, is reset only on one side.

Thus the method is based on an automatic report of the slave to the master, that contains the current state of the slave component as well as its prehistory, initiated by a specific, unambiguous communications event. This can be triggered by the occurrence of the undervoltage in CD changer 2 or by the reset of CD changer 2.

On the basis of all start-up information of the connected slaves as well as the local data contained in nonvolatile memory 4 of the master, master 1 can now very efficiently reconstruct the prior application state after a failure.

If the component, deviating from the exemplary embodiment, reports that it is new to the network, then a comparison with the stored data of the master indicates whether this component had a failure, for example, an extreme undervoltage, a fatal software failure, or the like, which would be important, for example, for a system diagnosis, or whether it is truly new to the network. In this case, a specific configuration sequence which is explained further below in an exemplary embodiment could occur.

In summary, the method according to the present invention, in this exemplary embodiment, makes an event-oriented flagging or memory function of the component possible and contains the following mechanisms.

Immediately after the successful (re)setup of the 1:1 connection to the master, as a first application message, a slave automatically transmits to every master associated with it a special information message having status information ("start-up info") in the following cases:

after the successful local initialization or local reset of the communication layers and after a successful reset of the communication layers by the master.

In this context, it should be taken into account that fundamentally either—master or slave—can begin reciprocal communication independent of its hierarchical embedding in the overall system of the network.

Since the prehistory can be derived from the master on the basis of the start-up info of the slaves, additional possibilities for a network-wide diagnosis are generated.

In the following second exemplary embodiment, a further system is composed of a master component of any type and two slave components of any type, and, in a further transformation described below, three slave components of any type.

Initially, in addition to the master, two further components A, C—slaves of the master—are located in the network. A further component B is known to the master, but it is not (yet) connected.

The present method according to the invention can be described for this system in accordance with FIG. 2.

Depicted by way of example is a network status table, stored in the nonvolatile memory of the master, having configuration, connection, and application states of the known slave.

| known slaves | network configuration | connection status | application status |
|---|---|---|---|
| component A | "present" | "connection set up" | "application on" |
| component B | "not available" | "no connection" | "not available" |
| component C | "present" | "connection set up" | "application off" |

The network status table was kept as simple as possible for the purpose of better intelligibility. Normally, a table of this type contains far more information, e.g., configuration data for the individual connections.

For reasons of simplicity, this example only cites the application main states "on" and "off" or "not available." In addition to the information in this network status table, the master also stores its own prehistory.

In a modification of the aforementioned example (reconnection of a slave), the master, after a connection setup, receives the following "start-up info" from component B:

B to master: "B for the first time in the network, application state 'off'."

The master, on the basis of this information, can start a special configuration sequence. The network status table then is changed as follows:

| known slaves | network configuration | connection status | application status |
|---|---|---|---|
| component A | "present" | "connection set up" | "application on" |
| component B | "present" | "connection set up" | "application off" |
| component C | "present" | "connection set up" | "application off" |

From this time point on, the master is in a position to start the application of component B and to control all available functions.

In the following, an exemplary failure case is depicted.

In a further modification of the aforementioned system state, the master, after a fresh connection setup of components A and C, receives the following "start-up information":

A to master: "A was already in the network, application 'off'."

C to master: "C is in the network for the first time, application 'off'."

After a comparison with the stored information, the master can now once again directly reconstruct the prior state through selected application messages (in this simple example, only one message is necessary):

Master to A: "Application 'on'."

Furthermore, the master can determine that component A has performed a "warm start" and component C has even performed a "cold start," since component C is already present in the network. This data can be managed using special failure counters and can be evaluated by diagnosis software.

Although the present invention was described above on the basis of advantageous exemplary embodiments, it is not limited to them, but rather can be modified in many ways.

Thus the method according to the present invention can also be employed for more complex systems, in which the master of at least one slave is in turn the slave of master on a higher plane.

It is likewise applicable in systems in which at least one slave is assigned to more than only one master.

Also, the method according to the present invention can be used in networks having client-server architectures, the client generally taking over a certain master functionality.

Furthermore, in monitoring and failure diagnosis systems, it can, in principle, be used in many technical, networked devices. In particular, in the automotive area, the most various application possibilities arise, in this context, in failure monitoring and failure diagnosis by networked electronic control units.

Similarly, the communications connections between the components can be realized by wireless connections.

1 first logical component, master (radio)
2 second logical component, slave (CD changer)
3 communications connection
4 non-volatile memory
5 preferably non-volatile memory
6 watchdog telegram

What is claimed is:

1. A method for coordinating network components including at least one first logical component and at least one second logical component, each of the at least one first logical component and the at least one second logical component corresponding to a specific application and communicating with each other via a network on a communication plane, the communication plane being substantially independent from an application plane, the at least one first logical component and the at least one second logical component standing in a master slave relationship to each other, the method comprising the steps of:

in response to a specific event concerning at least one of the at least one first logical component and the at least one second logical component, establishing a communications connection between the at least one first logical component and the at least one second logical component at an initiative of one of the at least one first logical component and the at least one second logical component;

transmitting an information message from the at least one second logical component to the at least one first logical component via the communications connection, the information message including at least information regarding a current application status of the at least one second logical component, the information of the transmitted information message being stored in a first nonvolatile memory of the at least one second logical component, a content of the first nonvolatile memory being actualized every time a change occurs in the application status of the at least one second logical component;

comparing the information of the transmitted information message in the at least one first logical component with information stored in a second nonvolatile memory of the at least one first logical component, the information stored in the second nonvolatile memory concerning at least one of the at least one first logical component and the at least one second logical component; and coordinating the at least one second logical component on the application plane by the at least one first logical component as a function of a result of the comparison, wherein:

the step of coordinating includes causing the at least one first logical component to reconstruct an application state of the at least one first logical component and of the at least one second logical component that was present before the step of establishing by using the information of the transmitted information message and the information stored in the second nonvolatile memory of the at least one first logical component.

2. The method according to claim 1, further comprising the step of:

storing the information of the transmitted information message in the second nonvolatile memory of the at least one first logical component.

3. The method according to claim 1, further comprising the step of:

after a reset of an already started application, transmitting the information message from one of the at least one first logical component and the at least one second logical component to another of the at least one first logical component and the at least one second logical component.

4. The method according to claim 1, wherein:

the step of coordinating includes one of the step of resetting on the application plane and the step of configuring on the application plane.

5. The method according to claim 1, wherein:

the method is performed in an automotive on-board information system.

6. The method according to claim 1, wherein:

the method is performed for at least one of network-wide failure location and failure diagnosis of the at least one first logical component and the at least one second logical component.

* * * * *

UNITED STATES PATENT AND TRADEMARK OFFICE
CERTIFICATE OF CORRECTION

PATENT NO. : 7,103,000 B1
APPLICATION NO. : 09/581101
DATED : September 5, 2006
INVENTOR(S) : Detlef Rode et al.

It is certified that error appears in the above-identified patent and that said Letters Patent is hereby corrected as shown below:

On the title page, item # (57) Abstract, line 4, change "and communicate with" to --and communicates with--

Column 1, line 45, change "to reproduce to reproduce" to --to reproduce--

Column 5, line 20, change "memory 4, 5." to --memories 4, 5.--

Column 5, line 21, change "radio 1 as master" to --radio 1 as master,--

Column 5, line 26, change "memory 4 and 5," to --memories 4 and 5,--

Column 7, line 51, change " the master, that contains" to --the master that contains--

Column 8, line 29, change "according to the invention" to --according to the present invention--

Signed and Sealed this

Twentieth Day of February, 2007

JON W. DUDAS
*Director of the United States Patent and Trademark Office*